United States Patent [19]

Layer et al.

[11] Patent Number: 4,721,196

[45] Date of Patent: Jan. 26, 1988

[54] OVERTRAVEL STOP

[75] Inventors: John C. Layer, Caledonia; Jeffrey D. Metcalf, Rockford, both of Ill.

[73] Assignee: Sundstrand Corporation, Rockford, Ill.

[21] Appl. No.: 823,791

[22] Filed: Jan. 29, 1986

[51] Int. Cl.⁴ .................. F16D 65/14; F16D 71/00
[52] U.S. Cl. .................................... 192/141; 192/139
[58] Field of Search ........... 192/141, 139, 149, 114 T, 192/7; 464/87, 89; 188/134

[56] References Cited

U.S. PATENT DOCUMENTS

| | | | |
|---|---|---|---|
| 2,268,412 | 12/1941 | McCombs | 192/108 |
| 2,502,573 | 4/1950 | Lee, II | 74/405 |
| 2,504,018 | 4/1950 | Gibson et al. | 192/141 X |
| 2,620,911 | 12/1952 | Krell | 192/141 |
| 2,837,925 | 6/1958 | Rowley et al. | 74/10.2 |
| 2,902,876 | 9/1959 | Pollock | 74/414 |
| 3,087,105 | 4/1963 | Hoover | 192/141 X |
| 3,293,925 | 12/1966 | Linsley | 74/10.2 |
| 3,333,477 | 8/1967 | Denkowski | 74/10.2 |
| 3,543,896 | 12/1970 | Mooney | 192/46 |
| 4,064,981 | 12/1977 | House et al. | 192/141 |
| 4,093,055 | 6/1978 | Blackburn et al. | 192/116.5 |
| 4,396,096 | 8/1983 | de Groot et al. | 188/134 |
| 4,442,928 | 4/1984 | Eastman | 192/3 N |
| 4,466,511 | 8/1984 | Garnett | 188/134 |
| 4,479,397 | 10/1984 | Jelinek et al. | 74/89.15 |
| 4,641,737 | 2/1987 | Gillingham et al. | 192/141 |

FOREIGN PATENT DOCUMENTS

| | | | |
|---|---|---|---|
| 687135 | 1/1940 | Fed. Rep. of Germany | 464/87 |
| 442845 | 12/1934 | United Kingdom | 464/89 |

*Primary Examiner*—Bonck Rodney H.
*Attorney, Agent, or Firm*—Wood, Dalton, Phillips, Mason & Rowe

[57] ABSTRACT

An overtravel stop for a rotary shaft, including a fixed stop having at least a pair of stop jaws disposed at different radii from the axis of the rotary shaft. A follower member is provided about the rotary shaft and is adapted to rotate with the shaft within a selected travel limit. The follower member is associated with a stop member having at least a pair of stop jaws disposed at the same different radii as the stop jaws of the fixed stop. The follower member is rotationally shiftable with respect to the shaft when the shaft reaches its travel limit. The stop member is axially movable into engagement with the fixed stop when the follower member rotationally shifts relative to the shaft. At least some of the stop jaws have negative rake angles, and a shock absorber is provided behind the fixed stop.

18 Claims, 7 Drawing Figures

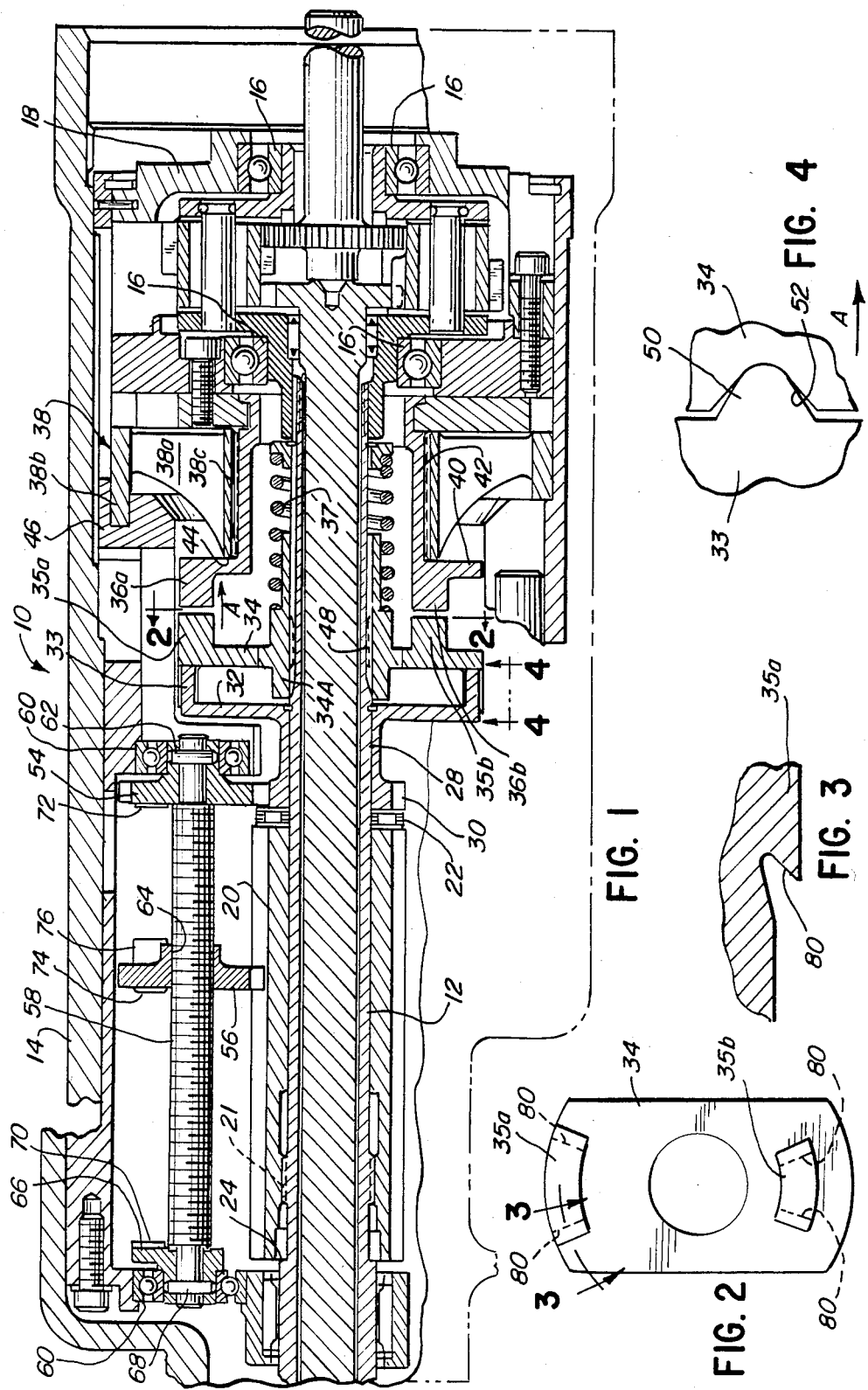

OVERTRAVEL STOP

DESCRIPTION

FIELD OF THE INVENTION

This invention relates to an overtravel stop and, more particularly, to an overtravel stop for use in limiting the rotation of an actuator The actuator can be used for movement and positioning of aircraft components such as a flight control surface or the like.

BACKGROUND OF THE INVENTION

Rotational overtravel stops often are crucial components of actuators used in environments where not only cost but also reliability, weight, size and simplicity are important. For example, where rotating actuators are used to adjust the flaps of an airplane wing, the reliability of the overtravel stops are crucial in order to prevent possible structural damage and also to prevent the flaps from being adjusted to an aerodynamically unstable position should there be a failure in the primary control for the actuator. Simplicity also is important as it helps to ensure the reliability of the stops. Of course, weight, size and power requirements also are obviously important factors with such actuators.

A number of overtravel stops have been developed in the prior art in an attempt to meet these crucial needs. For example, Pollock U.S. Pat. No. 2,902,876 and Rowley et al U.S. Pat. No. 2,837,925 disclose overtravel stops using two gear pairs with different gear ratios, one gear being on a threaded shaft and translating over that shaft, such that stops at either end of the translation are engaged to stop the main shaft. Lee U.S. Pat. No. 2,502,573 similarly uses two gear pairs having different gear ratios, where translation of one of the gears operates a device disconnecting the drive motor.

Krell U.S. Pat. No. 2,620,911 and House et al U.S. Pat. No. 4,064,981 illustrate another type of overtravel stop which uses friction brake members which are biased together at either limit of travel. These stops often require more space and weight than is desirable in those applications wherein the travel limits are separated by several thousand revolutions.

In copending application Ser. No. 804,387, now U.S. Pat. No. 4,641,737 filed Dec. 4, 1985, and assigned to the assignee of this invention, an overtravel stop for a rotating shaft is disclosed and includes a fixed stop and a stop member about the shaft and adapted for axial motion thereon to engage the fixed stop. A cam structure is provided to axially move the stop member into engagement with the fixed stop when a travel limit of the shaft is reached. The cam structure is actuated to axially move the stop member in response to rotational shifting of the member relative to the shaft. In one aspect of that invention, the rotational shifting is accomplished by the use of two gear pairs having different gear ratios where one set of corresponding gears in the different pairs rotate together within the shaft travel limits, causing different relative rotation of the other two gears until the travel limits are reached. In another aspect of that invention, a cam structure comprises a pin and slot connection between the stop member and the shaft, or between the stop member and one of the gears.

The overtravel-stop of the above-identified application has proven effective, and the present invention is directed to further improvements on such an overtravel stop.

SUMMARY OF THE INVENTION

An object, therefore, of the invention is to provide an improved overtravel stop of the character described for use in limiting the rotation of an actuator.

In the exemplary embodiment of the invention, the overtravel stop is provided for a rotary shaft and includes a fixed stop having a pair of primary stop jaws disposed at different radii from the axis of the rotary shaft. A follower member is provided about the rotary shaft and is adapted to rotate with the shaft within a selected travel limit. The follower member is associated with a stop member having at least a pair of primary stop jaws disposed at the same different radii as the stop jaws of the fixed stop. Means, including secondary stop means, are provided for rotationally shifting the follower member with respect to the shaft when the shaft reaches its travel limit. Means are provided for axially moving the stop member into engagement with the fixed stop when the follower member rotationally shifts with respect to the shaft.

Preferably, each pair of different radii stop jaws on the fixed stop and on the stop member are diametrically disposed on opposite sides of the axis of the rotary shaft.

Another feature of the invention is the provision of a torsional shock absorber means behind the fixed stop. The shock absorber means is parabolic or generally conically shaped to present an annular edge engageable with a flat surface on the back side of the fixed stop.

Another feature of the invention is to provide means for reducing the load on the secondary stop means when the primary stop jaws engage, particularly the load created by the torsional shock absorber. In one form of the invention, at least some of the primary stop jaws are provided with complementary engaging surfaces having negative rake angles. As disclosed herein, the complementary engaging surfaces of the stop jaws are generally hook-shaped. In another form of the invention, a differential spring arrangement is provided to reduce the load on the secondary stop means when the primary stop jaws engage.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a fragmented axial section through the overtravel stop of the invention;

FIG. 2 is an elevational view of the stop jaw face of the movable stop member, taken generally in the direction of line 2—2 of FIG. 1;

FIG. 3 is a fragmented section, on an enlarged scale, taken generally in the direction of line 3—3 of FIG. 2, illustrating the negative rake angle of the stop jaws;

FIG. 4 is a fragmented elevation, on an enlarged scale, taken generally in the direction of line 4—4, illustrating the cam means between the fixed stop and the movable stop member;

DESCRIPTION OF THE PREFERRED EMBODIMENT

Figure 5:
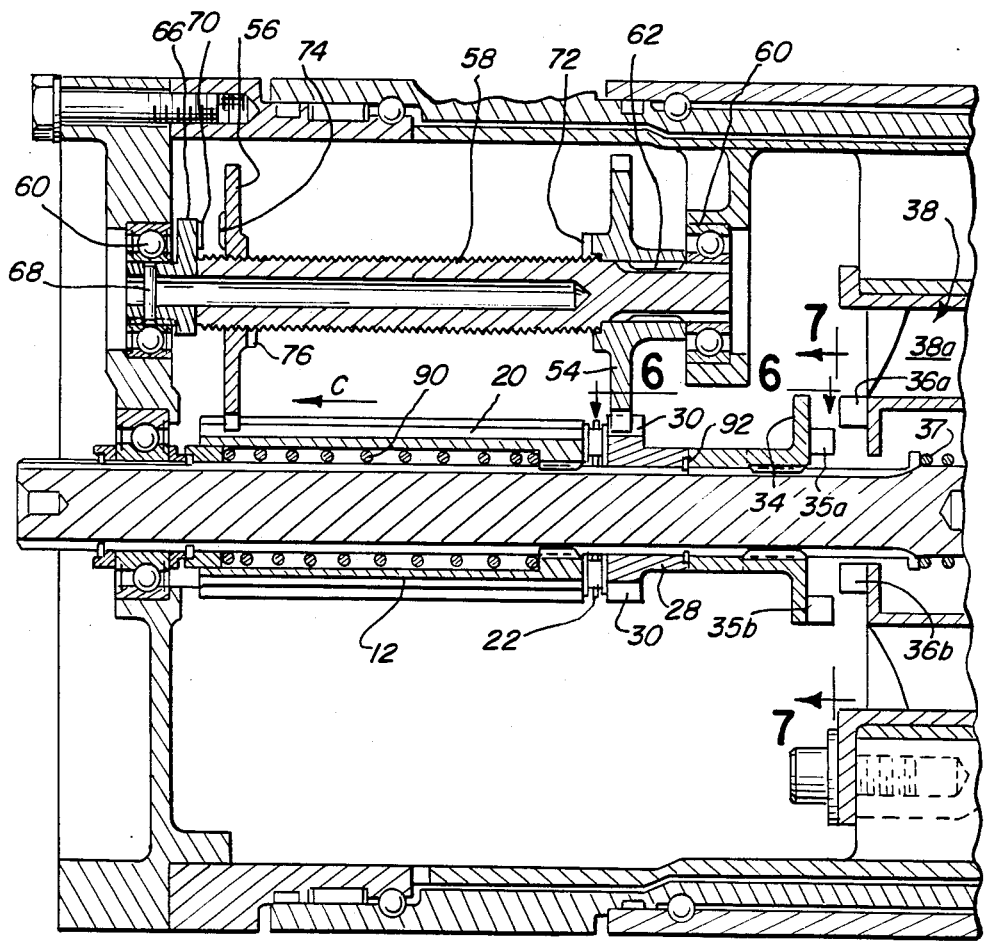
FIG. 5 is a fragmented, somewhat schematic view similar to that of FIG. 1, illustrating a modified form of the invention.

An embodiment of the invention is illustrated in FIG. 1 in the form of a bi-directional overtravel stop, generally designated 10, for a rotary shaft 12. The overtravel stop may be used in virtually any application where it is important to limit the rotation of a shaft 12, including, for example, shafts which are used to move the flaps of an aircraft wing. Shaft 12 is suitably supported for rotation with respect to a housing 14, such support in the embodiment shown including ball bearings 16 and a cap structure 18.

A drive gear 20 is fixed to shaft 12, as by a spline connection 21, for rotation therewith. The drive gear extends axially along shaft 12 (for reasons which will be apparent hereinafter) and is suitably secured against axial motion, as by a lock nut 22 securing the drive gear against a shaft shoulder 24. Although drive gear 20 could be formed unitarily with shaft 12, the above-described structure is preferable in that it allows the drive gear to be changed to change the travel limits imposed by the overtravel stop 10 (as will become apparent).

An annular member 28 is positioned about shaft 12 adjacent drive gear 20 and includes a shift gear 30. The annular member also includes a radial flange 32 terminating in an annular ring 33 having cam means (described hereinafter) engageable with an axially movable follower member 34A defining a stop member 34 having primary stop jaws 35a and 35b. Corresponding fixed primary stops 36a and 36b are suitably secured to housing 14, but provided with limited axial movement.

A compression spring 37 biases movable stop member 34 and stop jaws 35a,35b away from fixed stops 36a,36b.

Movable primary stop jaws 35a,35b and fixed primary stop jaws 36a,36b are of a type which, when axially aligned, engage each other along axially extending faces to prevent further rotation. Inasmuch as the engagement of the stop jaws can result in an abrupt cessation of motion, an elastomeric shock absorber 38 is provided behind a radially extending flange 40 of a sleeve member 42 which forms fixed primary stop jaws 36a,36b integrally thereon. Shock absorber 38 is parabolic or generally cone shaped to define a circular edge 44 for engaging the flat surface of fixed stop flange 40. Shock absorber 38 includes a plurality of angularly spaced, radially extending ribs 38a formed integrally with and supported by an outer annular ring portion 38b anchored in a housing block 46. Ribs 38a are formed integrally with an inner annular ring portion 38c which defines edge 44. Inner annular ring 38c surrounds annular sleeve portion 42 of the fixed stop.

Shock absorber 38, therefore, is a torsional shock absorber and transmits torque from fixed primary stop jaws 36a,36b to ground. This permits the fixed stops to be used on a higher speed shaft of low compliance while reducing the stop torque that normally would be present without the shock absorber.

Movable stop member 34 is connected by a spline connection 48 to shaft 12 for rotation therewith but allowing axial movement relative thereto to allow engagement of movable primary stop jaws 35a,35b with fixed primary stop jaws 36a,36b. Axial movement of stop member 34 is effected by rotation of annular member 28, through a cam engagement which is best illustrated in FIG. 4. It can be seen that ring portion 33 of annular member 28 has at least one cam projection 50 which is positionable within a cam detent 52 on movable stop member 34. Therefore, relative rotation between these members will cause cam projection 50 to ride up the sides of cam detent 52 and cause movable stop member 34 to move in the direction of arrow "A" (shown in both FIGS. 1 and 4) against the biasing of compression spring 37.

A pair of limiting gears 54 and 56 are supported for rotation about the axis of a limiting shaft 58. The limiting shaft is threaded and is suitably supported for rotation by ball bearings 60.

The first limiting gear 54 is fixed for rotation with limiting shaft 58 by a pin 62 such that first limiting gear 54 is axially fixed relative to limiting shaft 58. First limiting gear 54 engages shift gear 30.

Second limiting gear 56 engages drive gear 20 and has a central threaded bore 64 located over the threaded portion of limiting shaft 58.

First limiting gear 54 and shift gear 30 have a different gear ratio than second limiting gear 56 and drive gear 20.

Secondary stop means are operatively associated with limiting gears 54,56 and their related components to effect engagement of primary stop jaws 35a,35b,-36a,36b. More particularly, a limiting secondary stop member 66 is secured by a pin 68 for rotation with limiting shaft 58 at the end thereof opposite first limiting gear 54. Limiting stop member 66 includes at least one axially projecting secondary stop 70. First limiting gear 54 also includes at least one axially projecting secondary stop 72, both secondary stops 70,72 facing second limiting gear 56. Second limiting gear has an axially extending secondary stop 74 for engaging stop 70 and an oppositely facing, axially extending secondary stop 76 for engaging stop 72.

In operation of the overtravel stop 10 described to the extent above, shift gear 30 is caused to rotate with shaft 12 until either of the selected shaft travel limits are reached. At either travel limit, shift gear 30 is rotationally shifted around shaft 12, which shifting, through the cam structure described in relation to FIG. 4, causes stop member 34 and primary stop jaws 35a, 35b to move axially to engage fixed primary stop jaws 36a, 36b and thereby stop rotation of shaft 12.

Specifically, as shaft 12 rotates within its travel limits, it is followed by both drive gear 20 and shift gear 30, cam projection 50 being maintained in cam detent 52.

Due to the different gear ratios involved, rotation of drive gear 20 and shift gear 30 at the same rate causes first and second limiting gears 54 and 56 to rotate at slightly different rates relative to one another. Since the first limiting gear 54 rotates with limiting shafts 58, second limiting gear 56 rotates at a slightly different rate than the shaft threaded portion and thereby is caused to translate axially over the limiting shaft.

When secondary stops 70 and 74 or 72 and 76 engage, second limiting gear 56 is held against further rotation relative to limiting shaft 72, and thus also rotates at the same rate as first limiting gear 54. As a result, drive gear 20 and shift gear 30 rotate at different rates and, since drive gear 20 is fixed to shaft 12, shift gear 30 is rotationally shifted about shaft 12.

Shifting of shift gear 30 moves cam projection 50 relative to cam detent 52 and thus biases movable stop member 34 and primary stop jaws 35a,35b axially of the shaft, overcoming the biasing of compression spring 37 so that the stop jaws become aligned with and engage fixed primary stop jaws 36a,36b.

With the stop jaws engaged, annular member 28 is held against further rotation. Therefore, shaft 12 also is held against further rotation and an overtravel stop is provided.

Reverse rotation of shaft 12 away from the stop limit is, of course, easily accomplished without requiring any greater torque than used during normal rotation of the shaft. Reverse rotation can continue until second limiting gear 56 translates across limiting shaft 58 and engages the opposite secondary stop jaw 70 or 72.

Within the above operation, further features of movable primary stop jaws 35a,35b and fixed primary stop jaws 36a,36b are contemplated by this invention.

More particularly, since torsional shock absorber 38 rotates during the stop impact described above, the differential screw actuating mechanism described in relation to limiting gears 54,56 and limiting shaft 58 tends to continue to force primary stop jaws 35a,35b and 36a,36b into further engagement. This would build up significant torque across secondary stop jaws 70,72,74 and 76 and would cause these parts to be fabricated of drastically increased sizes. To alleviate this problem, means are provided for reducing the load on the secondary stop jaws when the primary stop jaws engage. In one form of the invention, a negative rake angle is provided on jaws 35a,35b,36a,36b to pull the jaws into further engagement upon contact. This negative rake angle is shown by a hook configuration 80 for jaw 35a as illustrated in FIG. 3. This negative rake angle of the jaws relieves the load on cam structure 50,52 and thus relieves the load on secondary stop jaws 70,72,74 and 76.

Another feature of the invention is to provide stop jaws 34a,34b and 36a,36b at different radii from the axis of rotary shaft 12. In other words, it can be seen in FIGS. 1 and 2 that movable stop jaw 35a and fixed stop jaw 36a are located a further distance from the axis of rotation and outside the arc of rotation of movable stop jaw 35b and fixed stop jaw 36b. Positioning the stop jaws at different radii allows a much higher effective ratio of the number of turns of stop shaft 12/the number of relative turns of limiting shaft 58. With the differential screw actuating device described above, high effective ratios require very precise positioning of secondary stops 72-76 and very tight backlash in the system. This is required to achieve engagement of the stops during the time when primary stop jaws 36a,36b are rotating over the space between the respective stop jaws. Positioning the stop jaws at unequal radii allows this space to be increased to just under 360°. This doubles the range of the effective ratios that can be used while maintaining reasonable tolerances. Another advantage of the unequal radii jaws is that the cocking moment induced on movable stop jaws 35a,35b that would be created by the force that pulls the jaws together is greatly reduced by the radii being close to diametral alignment. This cocking moment, if not minimized, would tend to cause the movable stop member 34 to jam.

Figure 6:
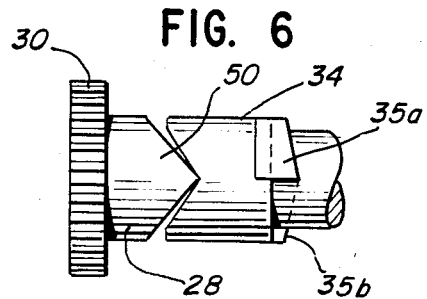
FIG. 6 is a view similar to that of FIG. 4, but taken generally in the direction of line 6—6 of FIG. 5.
Figure 7:
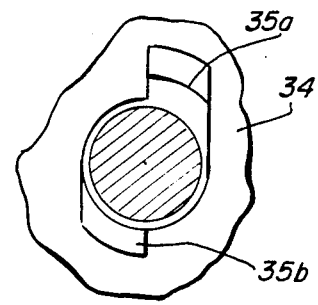
FIG. 7 is a fragmented elevational view taken generally in the direction of line 7—7 of FIG. 5.

As stated above, means are provided for reducing the load on the secondary stop means when the primary stop jaws engage, particularly the load created by torsional shock absorber 38. In the embodiment of the invention shown in FIGS. 1-4, this means comprises providing primary stop jaws 35a,35b and 36a,36b with a negative rake angle as shown in FIG. 3. FIGS. 5-7 show a modified form of the invention utilizing spring means for effectively backing up annular member 28 which carries shift gear 30 and cam projection 50.

More particularly, like numerals have been applied to FIGS. 5-7 to indicate components similar to or corresponding to complementary components described in relation to FIGS. 1-4. In the embodiment of FIGS. 1-4, drive gear 20 is secured against axial movement by a shaft shoulder 24 (FIG. 1). In the embodiment of FIGS. 5-7, drive gear 20 is spring loaded by a compression coil spring 90 whereby the drive gear and annular member 28 can yield in the direction of arrow "C" (FIG. 5). Spring 90 is stronger than compression spring 37 which, as described above, biases movable stop member 34 and stop jaws 35a,35b away from fixed stop jaws 36a,36b. A retaining ring 92 is provided to limit movement of stop member 34 in the direction of arrow "C". The same retaining ring 92 also limits movement of drive gear 20 and annular member 28 in the opposite direction. In essence, compression spring 90 preloads shift gear 30 against the retaining ring.

As stated above, when primary stop jaws 35a,35b and 36a,36b engage, torsional shock absorber 38 begins to twist. When this occurs, secondary stops 70,74 or 72,76 tend to drive the primary stop jaws into further engagement. The large forces developed in the primary stop jaws would cause large torque forces to be developed in the secondary stops if means are not provided to relieve these forces or loads, as with the negative rake angled primary stop jaws in the embodiment of FIGS. 1-4. In the embodiment of FIGS. 5-7, when the primary stop jaws are fully engaged, the spring force of spring 90 is overcome and cams 50,52 will cause annular member 28 and drive gear 20 to yield in the direction of arrow "C". With this structural combination, the maximum torque developed on the secondary jaw means is only sufficient to overcome the force of spring 90 and gear tooth friction. The force, therefore, is considerably less than the force that would be required if no means were provided to relieve the primary stop jaw engagement forces.

It will be understood that the invention may be embodied in other specific forms without departing from the spirit or central thereof. The present examples and embodiments, therefore, are to be considered in all respects as illustrative and not restrictive, and the invention is not to be limited to the details given herein.

We claim:

1. An overtravel stop for a rotary shaft, comprising:
   a fixing stop having at least a pair of stop jaws disposed at different radii from the axis of the rotary shaft;
   shift means about the rotary shaft and adapted to rotate with the shaft within a selected travel limit, the shift means bieng associated with a stop member having at least a pair of stop jaws disposed at the same different radii as the stop jaws of the fixed stop;
   means for rotationally shifting the shift means with respect to the shaft when the shaft reaches its travel limit; and means for axially moving the stop member into engagement with the fixed stop when the shift means rotationally shifts with respect to the shaft.

2. The overtravel stop of claim 1 wherein each pair of stop jaws on the fixed stop and on the stop member are diametrically disposed on opposite sides of the axis of the rotary shaft.

3. The overtravel stop of claim 1 wherein the complementary engaging surfaces of at least some of the stop jaws on the fixed stop and the stop member have negative rake angles.

4. The overtravel stop of claim 1, including shock absorber means behind said fixed stop.

5. An overtravel stop for a rotatry shaft, comprising:
a fixed stop;
shift means about the shaft and adapted to rotate with the shaft within a selected travel limit, said shift means being associated with a stop member;
means for rotationally shifting the shift means relative to the shaft when the shaft reaches its travel limit and to move the stop member axially into engagement with the fixed stop when the shift means rotationally shifts relative to the shaft; and
torsional shock absorber means behind the fixed stop for transmitting torque therefrom to ground.

6. The overtravel stop of claim 5 wherein said shock absorber means is generally conically shaped.

7. The overtravel stop of either of claims 5 or 6 wherein the shock absorber means includes an annular edge engagable with a flat surface on the fixed stop.

8. The overtravel stop of claim 5 wherein said fixed stop and said stop member each have at least one stop jaw, the stop jaws having complementray engaging surfaces with negative rake angles.

9. An overtravel stop for a rotary shaft, comprising:
a fixed stop having at least one stop jaw;
shift means about the shaft and adapted to rotate with the shaft within a selected travel limit, said shift means being associated with a stop member having at least one stop jaw;
means including secondary stop means for rotationally shifting the shift means relative to the shaft when the shaft reaches its travel limit and to move the stop member axially into engagement with the fixed stop when the shift means rotationally shifts relative to the shaft; and
means for reducing loads on the secondary stop means including said stop jaws having complementary engaging surfaces with negative rake angles.

10. The overtravel stop of claim 9 wherein said complementary engaging surfaces of the stop jaws are generally hook shaped.

11. An overtravel stop for a rotary shaft, comprising:
a fixing stop having at least one primary stop jaw;
shift means about the rotary shaft and adapted to rotate with the shaft within a selected travel limit, the shift means being associated with a stop member having at least one primary stop jaw;
means including secondary stop means for rotationally shifting the shift means with respect to the shaft when the shaft reaches its travel limit;
means for axially moving the stop member into engagement with the fixed stop when the shift means rotationally shifts with respect to the shaft; and
means for reducing loads on the secondary stop means when the primary stop jaws engage.

12. The overtravel stop of claim 11 wherein said load reducing means include primary stop jaws having negative rake angles on their engaging faces.

13. The overtravel stop of claim 11 wherein said load reducing means includes spring means yieldably backing said follower member.

14. An overtravel stop for a rotary shaft, comprising:
a fixed stop;
shift means about the shaft and adapted to rotate with the shaft within a selected travel limit, said shift means being associated with a stop member;
means including secondary stop means for rotationally shifting the shift means relative to the shaft when the shaft reaches its travel limit and to move the stop member axially into engagement with the fixed stop when the shift means rotationally shifts relative to the shaft;
shock absorber means behind the fixed stop; and
means for reducing loads on the secondary stop means when the fixed stop and stop member engage.

15. The overtravel stop of claim 14 wherein said load reducing means include engageable primary stop jaws on the fixed stop and the stop member, the primary stop jaws having negative rake angles on their engaging faces.

16. The overtravel stop of claim 14 wherein said load reducing means include spring means yieldably backing said following member.

17. An overtravel stop for a rotary shaft, comprising:
a fixed stop having at least one primary stop jaw;
shift means about the rotary shaft and adapted to rotate with the shaft within a selected travel limit, the shift means being associated with a stop member having at least one primary stop jaw;
first spring means for biasing the stop member away from the fixed stop;
means including secondary stop means for rotationally shifting the shift means with respect to the shaft when the shaft reaches its travel limit;
means for axially moving the stop member into engagment with the fixed stop when the shift means rotationally shifts with respect to the shaft; and
second spring means of a greater force than said first spring means for preloading said means for rotationally shifting the shift means to reduce the loads on the secondary stop means when the primary stop jaws engage.

18. An overtravel stop for a rotary shaft, comprising:
a fixed stop having at least one stop jaw with a load relieving negative rake angle;
a stop member on the rotary shaft engageable with the fixed stop when the shaft reaches a selected travel limit, the stop member having at least one stop jaw with a negative rake angle complementary to the rake angle of the stop jaw of the fixed stop; and
torsional shock absorber means behind the fixed stop for transmitting torque therefrom to ground.

* * * * *